Patented Oct. 19, 1948

2,451,805

UNITED STATES PATENT OFFICE 2,451,805

PROCESS OF COATING ASBESTOS

Thomas D. Callinan, Pittsfield, Mass., assignor to General Electric Company, a corporation of New York No Drawing. Application October 4, 1944, Serial No. 557,237

3 Claims. (Cl. 117—126)

The present invention comprises improved asbestos products. It is the object of my invention to improve the tensile and dielectric strength of products consisting substantially wholly of asbestos, or of asbestos associated with a substantial amount of a colloidal clay, or other modifying material.

The excellent heat-resisting properties of asbestos products render them highly desirable for electrical insulation purposes. However, for some forms of electrical insulation, for example tapes to be applied by winding upon conductors, asbestos products do not have tensile strength which is as high as desired to withstand winding tensions.

Heretofore, the tensile strength of asbestos products has been improved by impregnation with various organic resins and varnishes. The introduction of such combustible material reduces the fireproof character of the asbestos products.

I intend by the term "asbestos product" to include products containing besides asbestos also bentonite or other colloidal clay, and, in fact, any modifying or associated material.

In accordance with my present invention, the tensile strength of fabricated asbestos products is increased by the deposition in situ upon the asbestos fibers of an oxide of a polyvalent metal of the class characterized by being capable of forming oxides having colloidal properties.

Solutions of soluble salts of metals chosen from group II of the periodic system, such as magnesium, barium, calcium, and zinc and also aluminum (group III) may be used to carry out my invention. The choice of the cation metal is governed by the characteristics of the type product required, that is, whether a flexible sheet for winding or a more rigid sheet for spacing is desired.

In general, the asbestos fiber product is treated with an aqueous solution of a metallic chloride, followed by an alkaline treating agent which is capable of depositing the oxide in the interstices of the asbestos product. The alkaline treating reagent should be volatilizable upon heating. The colloidal oxide formed in situ in the asbestos product fills its interstices and, as will be shown, improves the physical properties of the product in various respects.

Sheet material consisting of asbestos and bentonite may be made as described in a copending application of Theodore R. Walters, Ser. No. 370,807, filed December 19, 1940, now abandoned. In preparing the sheet material described in this application asbestos fibers are brought to a state of fine subdivision, the fiber bundles as they occur in nature being mechanically subdivided by an appropriate beating apparatus while suspended in water. The asbestos fibers should be freed from magnetic particles and other impurities. The bentonite or other colloidal clay also is suitably purified and separated from noncolloidal particles, that is, in general freed from particles having a size as great as 500 mmu. The purified and subdivided asbestos and the purified bentonite are suspended in water, the asbestos preferably being preponderant in amount. On a dry weight basis, about 88 parts of asbestos and 12 parts of bentonite are favorable proportions.

To the suspension, when thoroughly mixed, is added an electrolyte, for example a suitable salt of copper such as copper acetate, to chemically modify the bentonite whereby the bentonite is precipitated upon the asbestos fiber. The copper content of about 3 to 4% referred to the dry weight of the bentonite is suitable. The copper salt appears to chemically combine with the bentonite and improve the final product, for example by decreasing its water-absorptivity. The suspension of asbestos and bentonite is collected and separated from the water upon the screen of a paper-making machine. The suspension is treated in a manner similar to ordinary cellulosic paper pulp when being converted into sheet material by the usual paper-making technique. The resulting paperlike product, upon removal from the screen of the paper-making machine, is dried and in some cases baked at a temperature of about 175° C. for about one hour, although the baking step is not an essential one.

Ordinary asbestos paper or a sheet product consisting of asbestos and bentonite as above described is impregnated with a solution of a soluble salt of any of the above indicated metals. For example, 5 parts of magnesium chloride, or other soluble magnesium compound, are dissolved in 20 parts of water. Asbestos sheet material is impregnated with the solution and dried. Upon drying, the asbestos product thus impregnated is brought into contact, as by dipping, with an alkaline solution such as a solution of 5 parts of concentrated aqueous ammonia in 20 parts of water. All proportions are by weight. The asbestos product thereupon is dried and subjected to an elevated temperature, for example at about 175° C.

The following table illustrates the improved properties of a sheet material prepared by the above method as compared to those of the untreated sheet:

|  | Initial Properties | Properties of Treated Product |
|---|---|---|
| Thickness | 3.0 mils | 3.6 mils. |
| Density | 0.47 (apparent) | 0.65 (apparent). |
| Breaking Strength | 0.2 Kilogram | 2.21 Kilograms. |
| Tensile Strength | 300 lb./sq. in. | 2700 lb./sq. in. |
| Dielectric Strength | 250 volts per mil | 415 volts per mil. |
| Power Factor | 20% | 6%. |

The tenfold increase in tensile strength makes the treated sheet much more efficient for handling when used for winding; and the marked improvement in electrical properties increases the usefulness of the product as an insulator.

In a similar manner, inorganic sheet material may be impregnated with a chloride of barium, calcium, zinc or aluminum, or mixtures of such metals, and treated with ammonia, an amine, or other suitable alkaline material whereby the oxide is deposited in the sheet material.

For example, asbestos sheet material having a thickness of several mils and a density of about 0.37 may be treated by dipping into an aqueous solution of salts of an alkaline earth metal, for example calcium chloride, a 15 per cent solution being satisfactory. The impregnated product is subjected to an ammonium hydroxide solution whereby calcium hydroxide is formed and precipitated upon the fibers of the asbestos. The product is heat-treated as described in connection with the impregnation with magnesium chloride. The thickness of the dried sheet will be found to have increased, say from 3 to 3.7 mils. The density is increased, and may be nearly doubled. The tensile strength is greatly increased, say from an original 40 pounds per square inch to 2700 pounds per square inch. The dielectric strength may be increased from 60 or 80 volts per mil to 250 volts per mil.

The following tabulation shows the improvement noted when sheets consisting of asbestos and bentonite and made as above described were impregnated with various other salts. The impregnated sheets were treated to precipitate the hydroxide which in turn was converted to the oxide. The methods of test are the standardized test methods of the American Society for Testing Materials, ASTM, D-67, February 1944. The tensile strength of the sheet stock (3 mils thickness) before impregnation was 150 pounds per inch squared.

| Impregnating Salt | Breaking Strength in Kilograms | Tensile Strength, Pounds per Square Inch |
|---|---|---|
| $BaCl_2$ | 2.25 | 2,150 |
| $ZnCl_2$ | 0.82 | 1,000 |
| $AlCl_3$ | 2.10 | 1,655 |
| $SnCl_4$ | 2.14 | 1,655 |

Although a 15 to 20 per cent solution of salt is satisfactory for impregnation, considerable latitude is permissible. A range of solution from 5 to saturation may be used for impregnation depending on the degree of impregnation required.

In a copending application Ser. No. 557,238 filed concurrently herewith I have described and claimed asbestos products containing tin oxide.

What I claim as new and desire to secure by Letters Patent of the United States, is:

1. The method of treating a fabricated, flexible, paper-like sheet material consisting of a major portion of asbestos fiber and a minor portion of bentonite to increase the tensile strength thereof, which comprises impregnating said sheet material with a solution of a compound of a metal selected from the group consisting of magnesium, barium, calcium, zinc and aluminum, thereafter impregnating said sheet material with a solution of ammonia, drying said sheet and heating the dried sheet at a temperature of about 175° C. to obtain a product having a tensile strength substantially greater than that of the untreated material.

2. The method of treating a fabricated, flexible, paper-like sheet material consisting of a major portion of asbestos fiber and a minor portion of bentonite to increase the tensile strength of said material, which comprises impregnating said sheet material with a solution of a chloride of a metal selected from the group consisting of magnesium, barium, calcium, zinc and aluminum, thereafter impregnating said sheet material with a solution of ammonia, drying said sheet and heating the dried sheet at a temperature of about 175° C. to obtain a product having a tensile strength substantially greater than that of the untreated material.

3. The method of treating a fabricated, flexible, paper-like sheet material consisting of a major portion of asbestos fiber and a minor portion of bentonite to increase the tensile strength of said material, which comprises impregnating said sheet material with a solution of magnesium chloride, thereafter impregnating said sheet material with a solution of ammonia, drying said sheet and heating the dried sheet at a temperature of about 175° C. to obtain a product having a higher density, dielectric strength and tensile strength and a lower power factor than untreated material.

THOMAS D. CALLINAN.

REFERENCES CITED

The following references are of record in the file of this patent:

UNITED STATES PATENTS

| Number | Name | Date |
|---|---|---|
| 1,230,085 | Ashenhurst | June 12, 1917 |
| 1,798,996 | Batcheller | Mar. 31, 1931 |
| 1,798,997 | Batcheller | Mar. 31, 1931 |
| 2,323,387 | Edelstein | July 6, 1943 |
| 2,354,876 | Owens | Aug. 1, 1944 |

OTHER REFERENCES

"Handbook of Chemistry & Physics," 28th ed., Chem. Rubber Publ. Co., pp. 408–9.

Mellor, "Mellor's Modern Inorganic Chemistry," revised ed. 1939, N. Y., page 620.